(12) United States Patent  (10) Patent No.: US 9,237,426 B2
Weiss  (45) Date of Patent: Jan. 12, 2016

(54) DEVICE MESSAGING ATTACK DETECTION AND CONTROL SYSTEM AND METHOD

(71) Applicant: WaveMarket, Inc., Emeryville, CA (US)

(72) Inventor: Andrew Weiss, San Ramon, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

(21) Appl. No.: 14/224,068

(22) Filed: Mar. 25, 2014

(65) Prior Publication Data

US 2015/0281917 A1  Oct. 1, 2015

(51) Int. Cl.
*H04M 3/00* (2006.01)
*H04W 4/12* (2009.01)
*H04W 28/10* (2009.01)
*H04M 1/725* (2006.01)
*H04W 4/14* (2009.01)

(52) U.S. Cl.
CPC ............ *H04W 4/12* (2013.01); *H04M 1/72552* (2013.01); *H04W 4/14* (2013.01); *H04W 28/10* (2013.01)

(58) Field of Classification Search
CPC ......... H04W 4/12; H04W 4/14; H04W 28/10; H04M 1/72552
USPC ................ 455/419, 418, 414.1, 414.3, 412.2, 455/412.1
See application file for complete search history.

(56) References Cited

U.S. PATENT DOCUMENTS

| 4,956,825 | A | 9/1990 | Wilts et al. |
|---|---|---|---|
| 5,559,862 | A | 9/1996 | Bhagat et al. |
| 5,882,258 | A | 3/1999 | Kelly et al. |
| 5,973,683 | A | 10/1999 | Cragun et al. |
| 6,151,507 | A | 11/2000 | Laiho et al. |
| 6,690,940 | B1 | 2/2004 | Brown et al. |
| 7,705,726 | B2 | 4/2010 | Graves et al. |
| 7,873,695 | B2 * | 1/2011 | Clegg et al. .................. 709/206 |
| 7,876,704 | B1 | 1/2011 | Bims et al. |
| 8,095,175 | B2 | 1/2012 | Todd et al. |
| 8,107,432 | B2 | 1/2012 | Seo |
| 8,225,413 | B1 | 7/2012 | De et al. |
| 8,351,408 | B2 | 1/2013 | Daigle |
| 8,594,065 | B2 | 11/2013 | Polito et al. |
| 8,738,688 | B2 | 5/2014 | Myers et al. |
| 2003/0139175 | A1 | 7/2003 | Kim |
| 2003/0211889 | A1 | 11/2003 | Walker et al. |
| 2004/0161085 | A1 | 8/2004 | Horne |
| 2005/0003895 | A1 | 1/2005 | Nara |
| 2005/0188028 | A1 * | 8/2005 | Brown ................... H04L 51/12 709/206 |

(Continued)

FOREIGN PATENT DOCUMENTS

CN  WO 2014101758 A1 * 7/2014 .......... H04L 63/1441

OTHER PUBLICATIONS

U.S. Appl. No. 14/147,802, filed Jan. 6, 2014.

*Primary Examiner* — Khai M Nguyen
(74) *Attorney, Agent, or Firm* — Dovas Law, P.C.

(57) ABSTRACT

A messaging control system and method are provided. The method includes detecting incoming messages to a mobile device and outgoing messages from the mobile device. One or more processors determine a number of and a time proximity of the incoming messages or the outgoing messages, and message transmission or message receipt by the mobile device is limited based at least on the number of and time proximity of the incoming messages or the outgoing messages.

29 Claims, 8 Drawing Sheets

(56) References Cited

U.S. PATENT DOCUMENTS

| | | |
|---|---|---|
| 2005/0243771 A1 | 11/2005 | Hardy et al. |
| 2006/0031483 A1* | 2/2006 | Lund .................... G06Q 10/107 709/224 |
| 2006/0117263 A1 | 6/2006 | Locke |
| 2006/0270476 A1 | 11/2006 | Denkewicz |
| 2007/0039624 A1 | 2/2007 | Roberts et al. |
| 2007/0232340 A1 | 10/2007 | Yamauchi et al. |
| 2008/0172317 A1 | 7/2008 | Deibert et al. |
| 2008/0201441 A1 | 8/2008 | Bodic et al. |
| 2009/0002147 A1 | 1/2009 | Bloebaum et al. |
| 2009/0017750 A1 | 1/2009 | Marcinkiewicz |
| 2009/0055938 A1 | 2/2009 | Samuel |
| 2009/0089876 A1 | 4/2009 | Finamore et al. |
| 2009/0149203 A1 | 6/2009 | Backholm et al. |
| 2009/0181356 A1 | 7/2009 | Dasgupta |
| 2009/0204471 A1 | 8/2009 | Elenbaas et al. |
| 2009/0248436 A1 | 10/2009 | Takagi et al. |
| 2009/0271247 A1 | 10/2009 | Karelin et al. |
| 2009/0275367 A1 | 11/2009 | Reinisch et al. |
| 2009/0295562 A1 | 12/2009 | Shuster |
| 2009/0296904 A1 | 12/2009 | Brewer et al. |
| 2009/0298019 A1 | 12/2009 | Rogan et al. |
| 2010/0028844 A1 | 2/2010 | Wiseman |
| 2010/0106573 A1 | 4/2010 | Gallagher et al. |
| 2010/0210254 A1 | 8/2010 | Kelly et al. |
| 2010/0330543 A1 | 12/2010 | Black et al. |
| 2011/0047078 A1 | 2/2011 | Ginter et al. |
| 2011/0055546 A1 | 3/2011 | Klassen et al. |
| 2011/0093161 A1 | 4/2011 | Zhou et al. |
| 2011/0145927 A1 | 6/2011 | Hubner et al. |
| 2011/0151830 A1 | 6/2011 | Blanda et al. |
| 2011/0219081 A1* | 9/2011 | Parthasarathy ...... G06Q 10/107 709/206 |
| 2011/0275321 A1 | 11/2011 | Zhou et al. |
| 2011/0294520 A1 | 12/2011 | Zhou et al. |
| 2011/0296014 A1 | 12/2011 | Cancel et al. |
| 2011/0307434 A1 | 12/2011 | Rostampour et al. |
| 2012/0001548 A1 | 1/2012 | Recker et al. |
| 2012/0081500 A1 | 4/2012 | Border et al. |
| 2012/0110071 A1 | 5/2012 | Zhou et al. |
| 2012/0143496 A1 | 6/2012 | Chitre et al. |
| 2012/0166285 A1 | 6/2012 | Shapiro et al. |
| 2012/0171990 A1 | 7/2012 | Williams et al. |
| 2012/0172100 A1 | 7/2012 | Colar et al. |
| 2012/0188163 A1 | 7/2012 | Xiao |
| 2012/0223861 A1 | 9/2012 | Kupfer et al. |
| 2012/0244883 A1 | 9/2012 | Tibbits et al. |
| 2012/0253918 A1 | 10/2012 | Marois |
| 2013/0054674 A1 | 2/2013 | Myers et al. |
| 2013/0102286 A1 | 4/2013 | Toksvig et al. |
| 2013/0111510 A1 | 5/2013 | Baker et al. |
| 2013/0143512 A1 | 6/2013 | Hernandez et al. |
| 2013/0143521 A1 | 6/2013 | Hernandez et al. |
| 2013/0151628 A1 | 6/2013 | Catalano et al. |
| 2013/0185411 A1 | 7/2013 | Martin |
| 2013/0217363 A1 | 8/2013 | Myers |
| 2013/0303106 A1 | 11/2013 | Martin |
| 2013/0305384 A1 | 11/2013 | Weiss |
| 2014/0057610 A1 | 2/2014 | Olincy et al. |
| 2014/0082065 A1 | 3/2014 | Anakata et al. |
| 2014/0194095 A1 | 7/2014 | Wynne et al. |
| 2014/0258357 A1 | 9/2014 | Singh et al. |

* cited by examiner

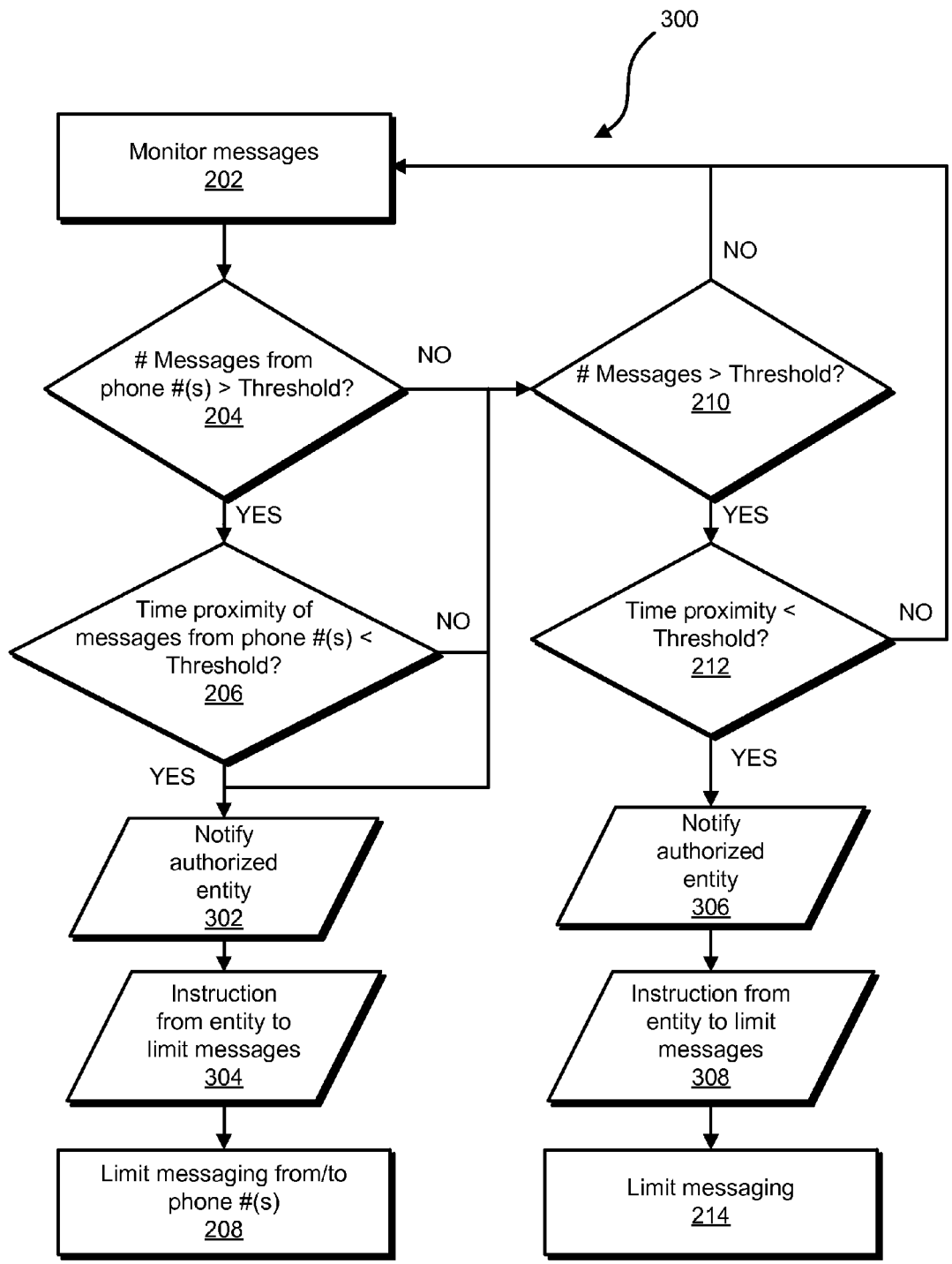

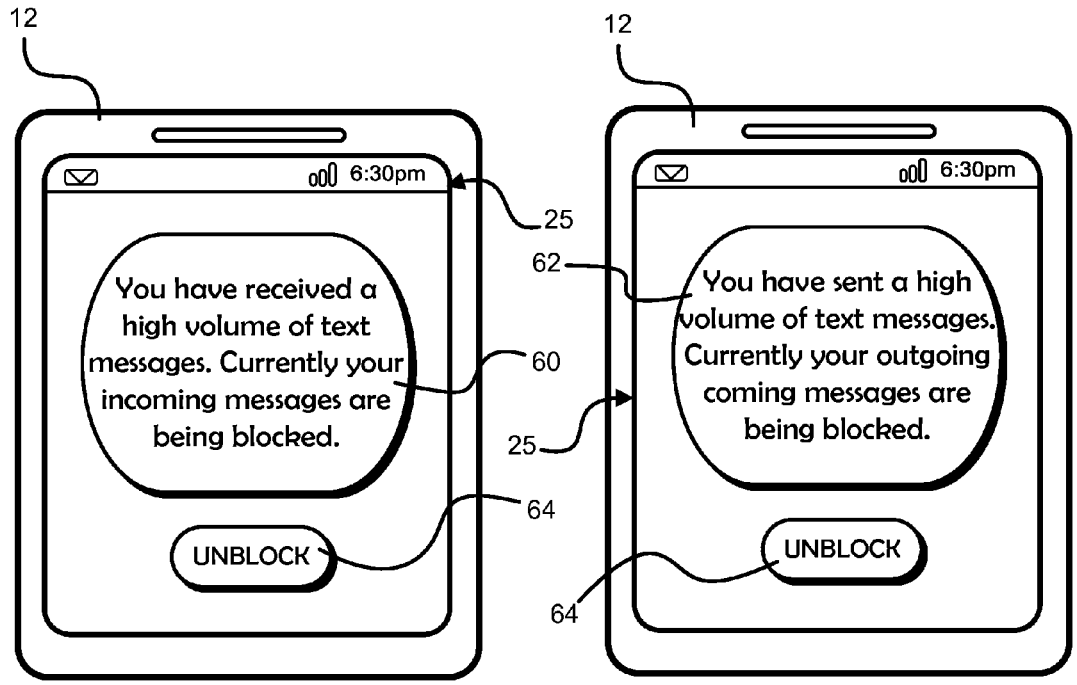
FIG. 7A   FIG. 7B
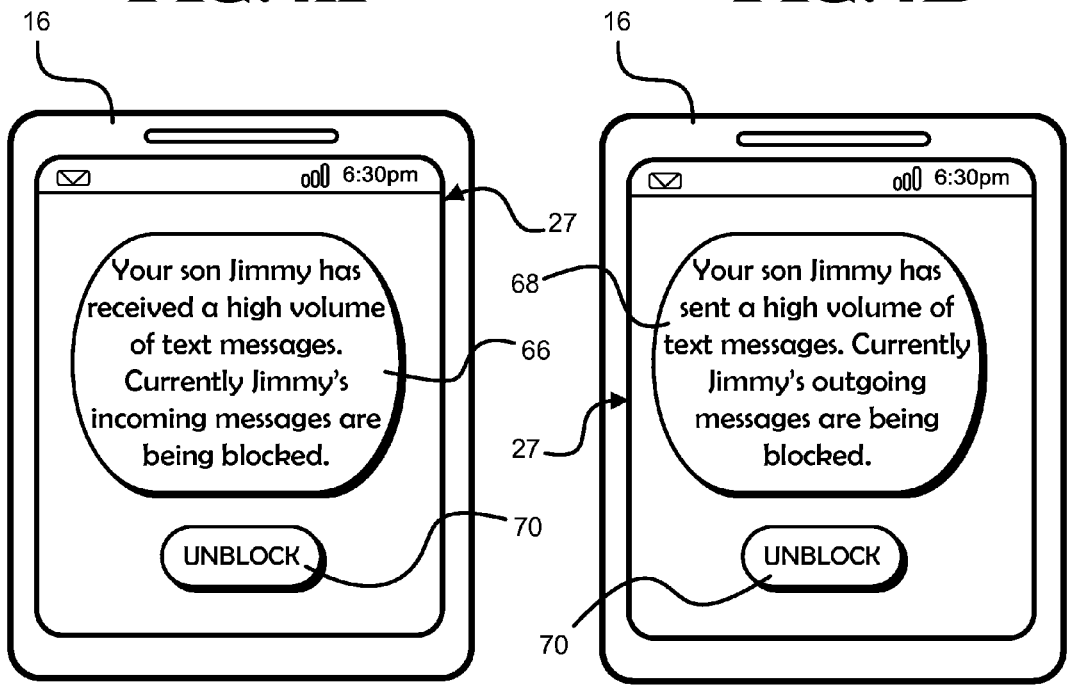
FIG. 7C   FIG. 7D

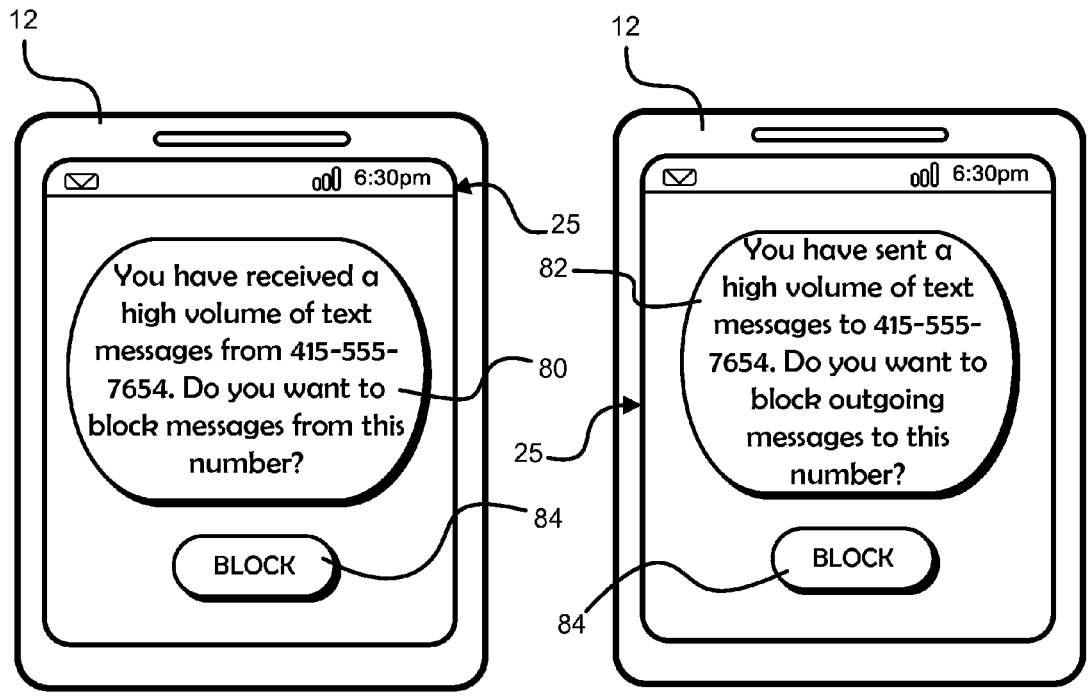
FIG. 8A   FIG. 8B
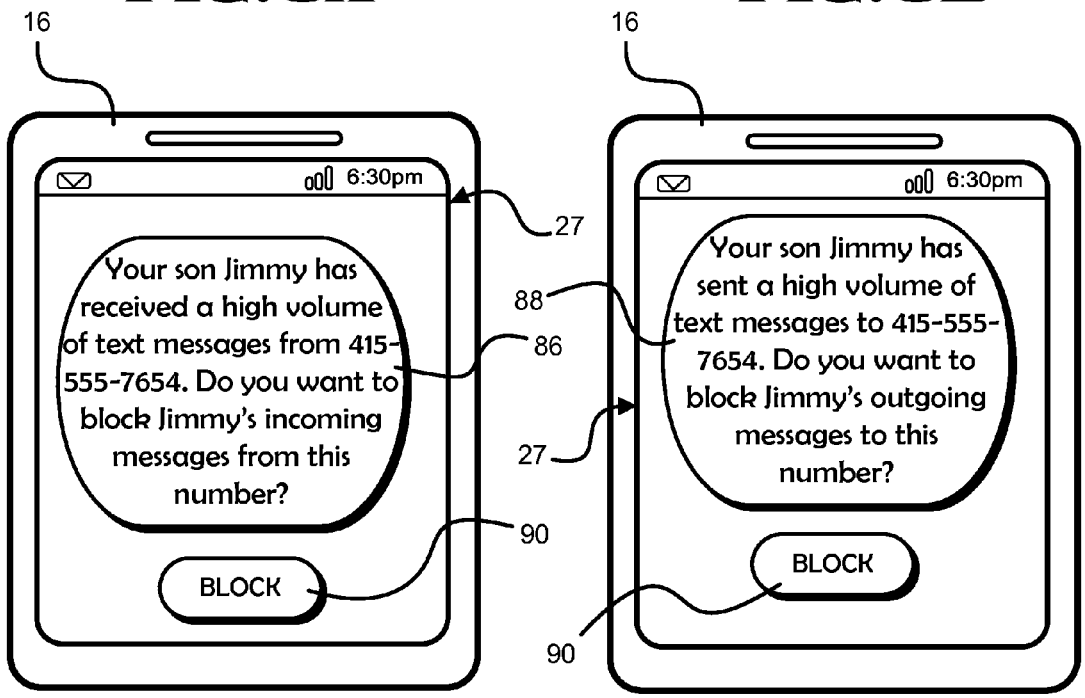
FIG. 8C   FIG. 8D

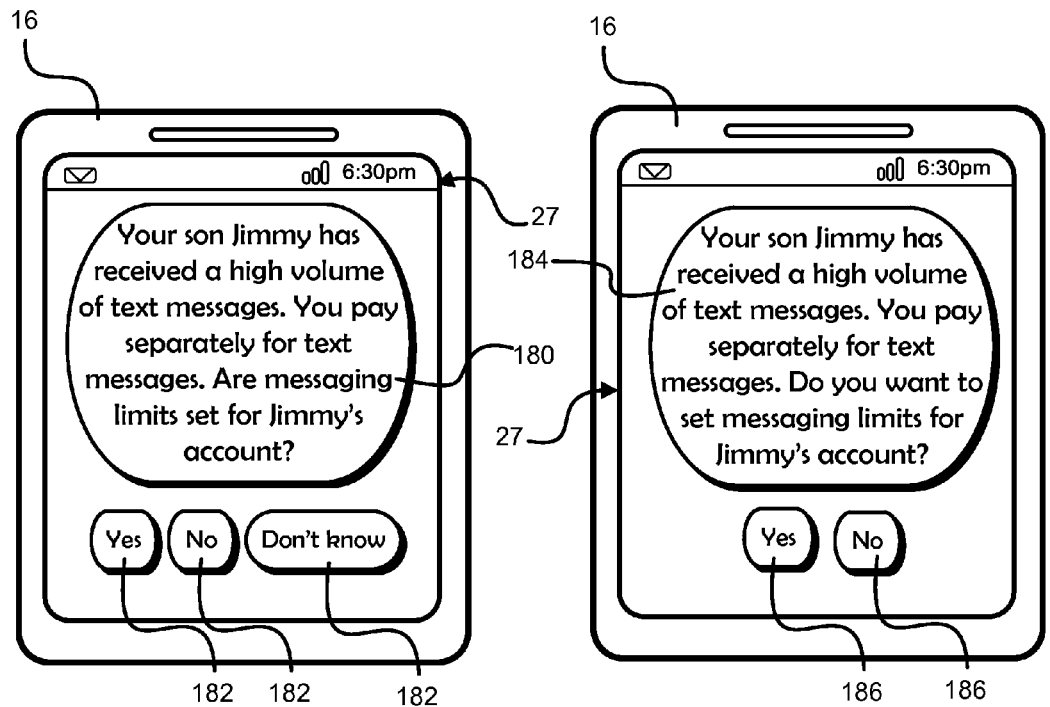
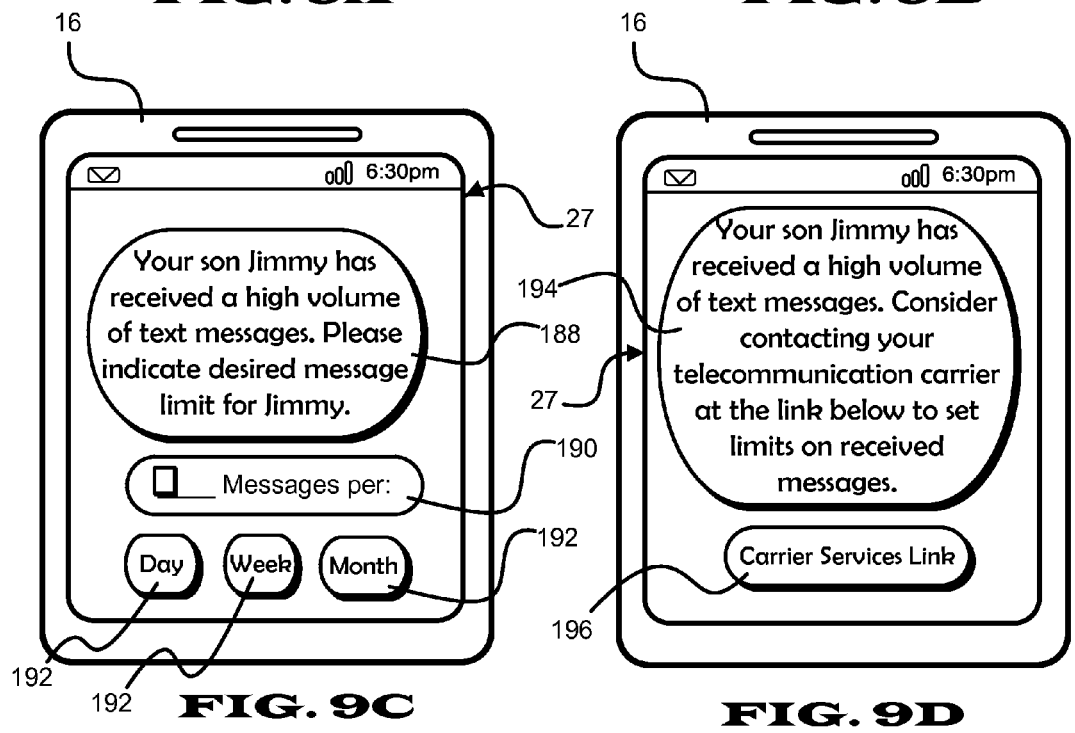

DEVICE MESSAGING ATTACK DETECTION AND CONTROL SYSTEM AND METHOD

BACKGROUND

"Text-bombing" is a colloquial term for the transmission of a large number of electronic messages such as Short Message Service ("SMS") protocol messages to a particular target communication device, for example a mobile phone, for the purpose of harassment, bullying, degrading service, denying service, or subjecting a telecommunications carrier account holder to fees associated with message receipt. Transmission of such messages may originate from one device or a plurality of devices. Applications are available for the purpose of automating the transmission of messages, for example executable on the Android operating system on a mobile communication device.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A messaging control method is provided. The method includes detecting incoming messages to a mobile device and outgoing messages from the mobile device. One or more processors determine a number of and a time proximity of the incoming messages or the outgoing messages, and message transmission or message receipt by the mobile device is limited based at least on the number of and time proximity of the incoming messages or the outgoing messages.

A computing system is provided comprising one or more non-transitory computer readable storage mediums having encoded thereon instructions that, when executed by one or more processors of the system, cause the system to perform a process including detecting incoming messages to a mobile device and outgoing messages from the mobile device. The process further includes determining by a processor a number of and time proximity of the incoming messages or the outgoing messages, and limiting message transmission and message receipt by the mobile device based at least on the number of and time proximity of the incoming messages or the outgoing messages.

A communications network is provided including a first device corresponding to a first user. The first device is configured for detecting incoming messages to the first device and outgoing messages from the first device. The first device is further configured for determining a time proximity of the incoming messages or the outgoing messages, and for transmitting a notification based at least on the number of and time proximity of the incoming messages or the outgoing messages. The network further includes a second device corresponding to a second user. The second device is configured for receiving a notification based at least on the number of and time proximity of the incoming messages to the first device or the outgoing messages to the first device and receiving instructions from the second user to limit message transmission or message receipt by the first device. The second device further transmits the instructions to a computing system operable to enable limiting message transmission and message receipt by the first device.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 3-6 are flowcharts showing methods for controlling electronic message delivery.

Figure 1:
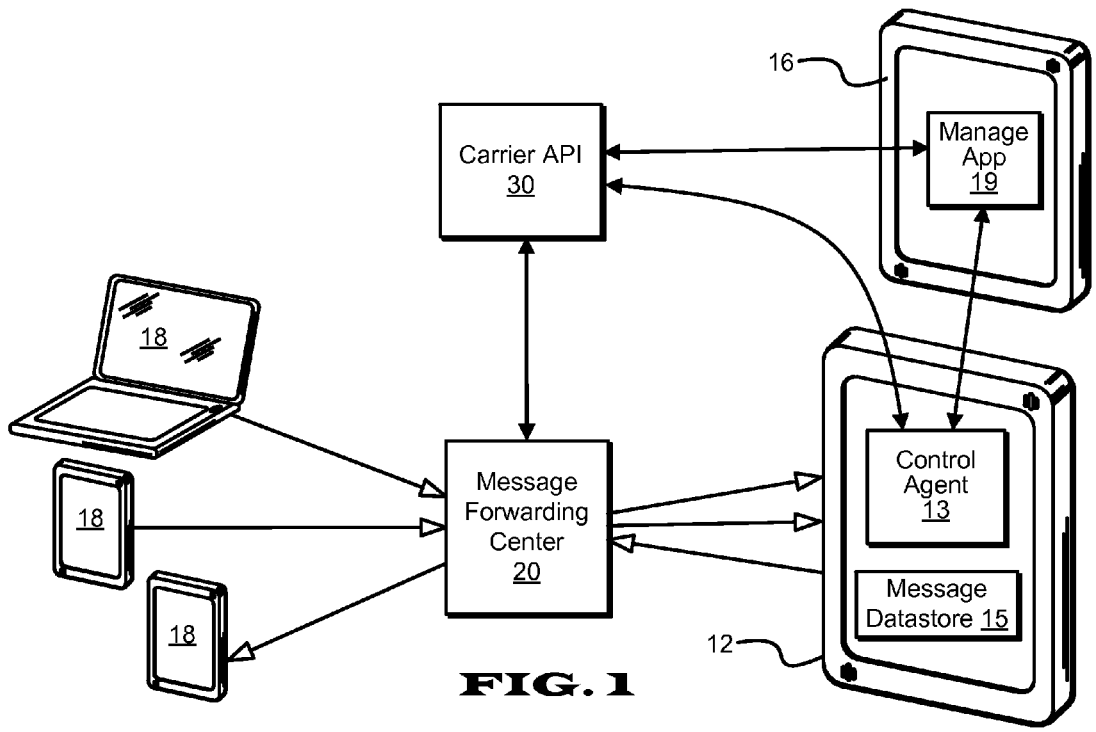
FIGS. 1 and 2 are diagrams showing communications networks.

FIGS. 7A-7D, 8A-8D, and 9A-9D show mobile devices displaying example notifications pursuant to the described methods.

DETAILED DESCRIPTION OF ILLUSTRATIVE EMBODIMENT(S)

Embodiments of the invention are described below with reference to the drawing figures wherein like numerals represent like elements throughout.

Referring to FIG. 1, a communications network is provided including one or more wired or wireless networks or a combination thereof. The communications network can include one or more computer networks such as the Internet, phone networks, or other networks. A mobile communication device 12, for convenience of description termed the "target device 12", operates in the network. Software and/or hardware residing on a target device 12 enables a target control agent 13 ("control agent 13") to monitor incoming and outgoing messages to the target device 12 including Short Message Service ("SMS") protocol messages and other messaging protocols. The target device 12 can include for example a smartphone or other cellular enabled mobile device configured to operate on a wireless telecommunications network. Alternatively, the target device 12 can include a personal computer, tablet device, or other computing device configured with a message gateway (e.g., an SMS gateway) to enable transmission and receipt of messages. Configuration of the control agent 13 can be performed by a user using the target device 12, or alternatively using another system or device connected to target device 12 via a network connection.

The target device 12 is configured to receive electronic messages including SMS messages. A message forwarding center 20, for example a Short Message Service Center ("SMSC") is configured to forward messages to the target device 12 from transmitting devices 18 such as cellular phones, or other computing systems for example personal computers or web based servers which can connect to the message forwarding center 20, for example via GSM wireless protocol or via TCP/IP through the Internet. The target device 12 is further configured to transmit messages including SMS messages via GSM wireless protocol and/or TCP/IP through the Internet. Received and transmitted messages are stored in the message datastore 15 on the target device 12 which datastore 15 is monitored by the control agent 13.

A telecommunications carrier renders an application program interface (API) 30 available on a network connectable server system to enable setting of options pertaining to the handling of messages by the message forwarding center 20. The control agent 13 on the target device 12 can set messaging options via the carrier API 30. Further, a user with supervisory authority over the target device 12, for example a parent of a child user of the target device 12, can set messaging options for the target device 12 through the carrier API 30 via a computing device 16 using a management application 19 such as a web browser or other network enabled application. Alternatively, referring to FIG. 2 a control manager 40 in communication with the control agent 13 via the network can set messaging options via the carrier API 30 based on signals from the target control agent 13 or management application 19. The control manager 40 is enabled by a network connectable computing system and can service a plurality of target control agents 13 on a plurality of target devices 12.

Configuration of the control agent 13 can take place on the target device 12 or remotely over a network via another device such as the computing device 16 using the management application 19. A parent of a user of the target device 12 can for example configure the monitoring options of the control agent 13 locally when in physical possession of the target device 12, or remotely through use of the management application 19 to instruct the control agent 13 or to instruct the control manager 40.

The control agent 13 is configured to detect that the number of messages (e.g., text messages) per minute sent or received by the target device 12 exceed a particular threshold. The agent can further detect that a number of incoming or outgoing messages in an hour, a day, a week, a month, or other time period exceed a particular threshold. When the number of messages exceeds such threshold, a determination that a messaging attack (e.g., a "text bombing") is underway can be triggered, and the offending messages can be characterized as "message bombs" or "text bombs". For each threshold surpassed, the control agent 13 can be configured to respond in a particular manner.

One manner in which the control agent 13 can be configured to respond to messaging which surpasses a threshold is the transmission of a notification of the threshold achievement to a computing device 16 corresponding to a parent of the user of the target device 12 or other person responsible for such user's well-being. This notification can be an email, text message, voice message, or other electronic communication. This notification may optionally include the phone numbers of the offending incoming messages, or the phone numbers of the potentially attacking devices that sent the most messages. If outgoing messages from the target device 12 are detected as exceeding a threshold, the phone number of the intended receiving device or devices can be sent to the parent of the user of the target device 12 or to other supervisory entity, for example via message to the computing device 16.

Another manner in which the control agent 13 can be configured to respond to suspected messaging attacks is to limit the number of incoming or outgoing messages to a particular rate, for example, limiting the number of incoming messages to one per minute. The control agent 13 can further filter out messages that have been classified as message bombs or filter out messages from phone numbers from which suspected message bombs to the target device 12 originated. The control agent 13 can further prevent all incoming text messages, except those from a designated list (i.e., a "white list") for a particular period of time, for example, the remainder of the day, twenty four (24) hours, or one week.

Figure 2:
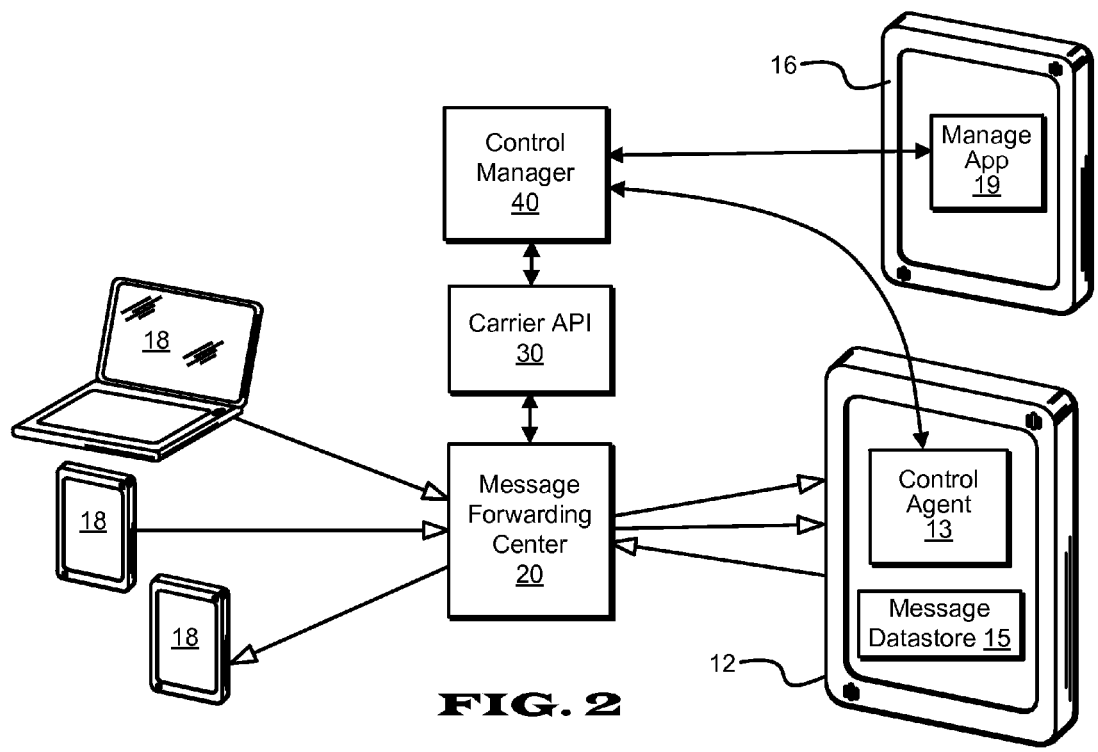
Figure 3:
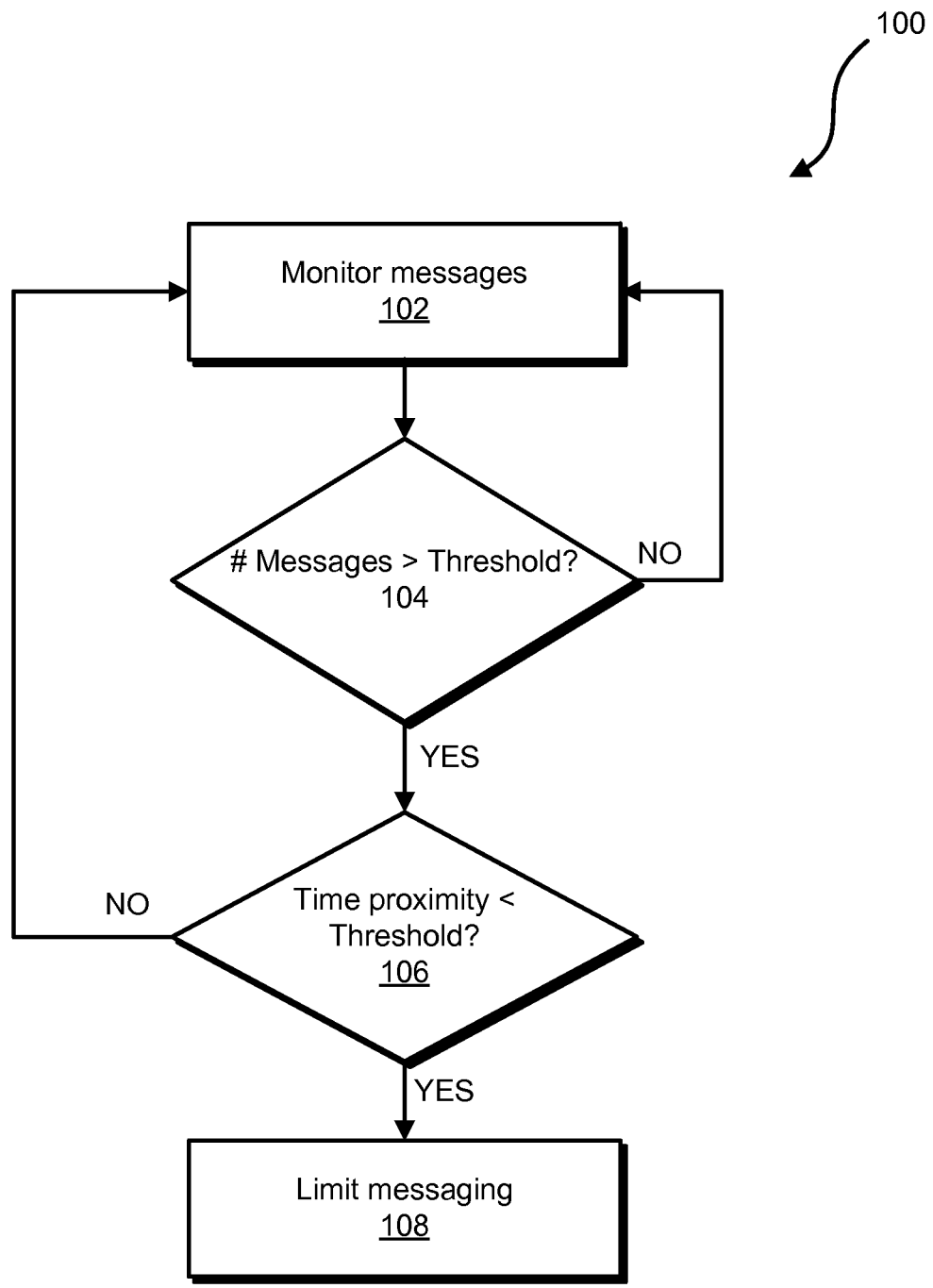

Referring to FIG. 3, a method 100 is shown for controlling delivery of electronic messages. The method 100 and associated processes are described with reference to the components shown in FIGS. 1 and 2, including the target control agent 13 and control manager 40, which can individually or in combination perform the method 100. The method 100 may alternatively be performed via other suitable systems.

In a step 102 incoming messages to a target device 12 and outgoing messages from the target device 12 are monitored. If it is determined that the number of messages is greater than a particular threshold (step 104), and if it is determined that the time proximity of the messages is less than a particular threshold (step 106), incoming or outgoing messages are limited (step 108). The control agent 13 can perform the method by monitoring the message datastore 15. Steps 104 and 106 correspond to determining a number of messages exceeds a particular threshold within a particular time period. An exemplary threshold number of messages may be one hundred (100), and an exemplary time proximity may be thirty (30) minutes, wherein if more than one hundred (100) messages are received within thirty (30) minutes, message transmission and/or message receipt is limited. A high volume of messages received by the target device 12 in a particular time period triggers the limiting of incoming messages, and a high volume of messages transmitted in a particular time period triggers the limiting of outgoing text messages.

Limiting message transmission or message receipt can include preventing transmission of all outgoing messages or reception of all incoming messages by a target device 12. Alternatively, limiting message transmission or message receipt can include preventing transmission of messages by the target device 12 to a particular phone number or preventing reception of messages by the target device 12 from a particular phone number. Alternatively, limiting message transmission or message receipt can include throttling messages to a particular rate of transmission or receipt, for example limiting messages to ten (10) messages sent or received each hour wherein excess messages are blocked or delayed. The control agent 13 can limit message transmission and receipt by contacting the carrier API as shown in FIG. 1, to enable blocking of message transmission at the message forwarding center 20 (e.g., SMSC). Alternatively, the control agent 13 can contact the control manager 40 to trigger message blocking via the carrier API 30 as shown in FIG. 2.

A notification is provided to the user of the target device 12 responsive to the number of sent or received messages exceeding a particular threshold within a particular period of time resulting in subsequent messages being blocked. Such notification can be provided on a display 25 of a target device 12 as shown in FIGS. 7A and 7B. In FIG. 7A, an exemplary notification 60 states "You have received a high volume of text messages. Currently your incoming messages are being blocked." In FIG. 7B, an exemplary notification 62 states "You have sent a high volume of text messages. Currently your outgoing messages are being blocked." The notifications 60, 62 can be generated by the control agent 13 and can be accompanied by an unblock button 64 allowing a user to instruct the control agent 13 to unblock blocked incoming or outgoing messaging via communication to the carrier API 30 (see FIG. 1) or via communication to the control manager 40 (see FIG. 2).

Alternatively, or in addition to a notification provided to the user of the target device 12, a notification can be provided to another entity via a computing device 16 on a display 27 responsive to the number of messages exceeding a particular threshold within a particular period of time. Such other entity can correspond for example to a parent of the user of the target device 12 or other person responsible for oversight of such user. Notifications to such entity can be generated by the management application 19 based on data received from the control agent 13 or the control manager 40. Notifications to such entity can comprise text messages (e.g., SMS, email) received by the computing device 16 transmitted from the control agent 13 via the target device 12 or received by the computing device 16 from the control manager 40. Notifications can alternatively be provided as voicemail from the control agent 13 or control manager 40. In FIG. 7C, an exemplary notification 66 states "Your son Jimmy has received a high volume of text messages. Currently Jimmy's incoming messages are being blocked." In FIG. 7D, an exemplary notification 68 states "Your son Jimmy has sent a high volume of text messages. Currently Jimmy's outgoing messages are being blocked." The exemplary notifications 66, 68 can be generated by the management application 19 based on data received from the control agent 13 or the control manager 40. An unblock button 70 is provided on the display 27 to allow a user of the device 16 to instruct the management application 19 to unblock incoming or outgoing messaging via communication to the carrier API 30 (see FIG. 1), communication to the control agent 13 (see FIG. 1), or communication to the control manger 40 (see FIG. 2).

The control agent 13 is further configured to determine that a number of messages originating from or transmitted to one or more particular phone numbers exceeds a particular threshold and that a time proximity of such messages is less than a particular threshold. The control agent 13 or control manager 40 can thereafter limit additional messages from or to the one or more particular phone numbers corresponding to the messages exceeding the threshold, instead of applying limits to all messages.

The control agent 13 can classify incoming or outgoing text messages as "safe" (i.e. a legitimate communication) or unsafe (e.g., "text-bomb") based on a similarity metric between a number of text messages received in close time proximity or sent in close time proximity, for example including similar text or sentiment. Classification can involve a comparison of messages in close time proximity to determine similarity. Classification can determine through sentiment analysis that messages received or sent in close time proximity have similar intent, for example hostile, aggressive, or negative intent, and such messages can be classified as unsafe. Even messages with seemingly benevolent content can be classified as unsafe, for example if based on a comparison message content is similar or identical to prior sent or received messages, suggesting a messaging attack is underway. The control agent 13 associates phone numbers with messages classified as unsafe based on the number of messages, time proximity of messages, and a determination of the particular similarity in the messages (e.g., similar text or sentiment). Thereafter limits can be applied to messages from/to such phone numbers.

Classification of messages (e.g., by text or sentiment) can further provide a mechanism for filtering messages, wherein for example messages with a hostile, aggressive, or negative intent correspond to a lower threshold number of messages to trigger messaging limits than messages with a determined benevolent intent. For example, ten (10) hostile text messages in an hour from a particular sender can trigger blocking of messages from the particular sender, whereas thirty (30) benevolent messages in an hour can be required to trigger message blocking from the particular sender.

Figure 4:
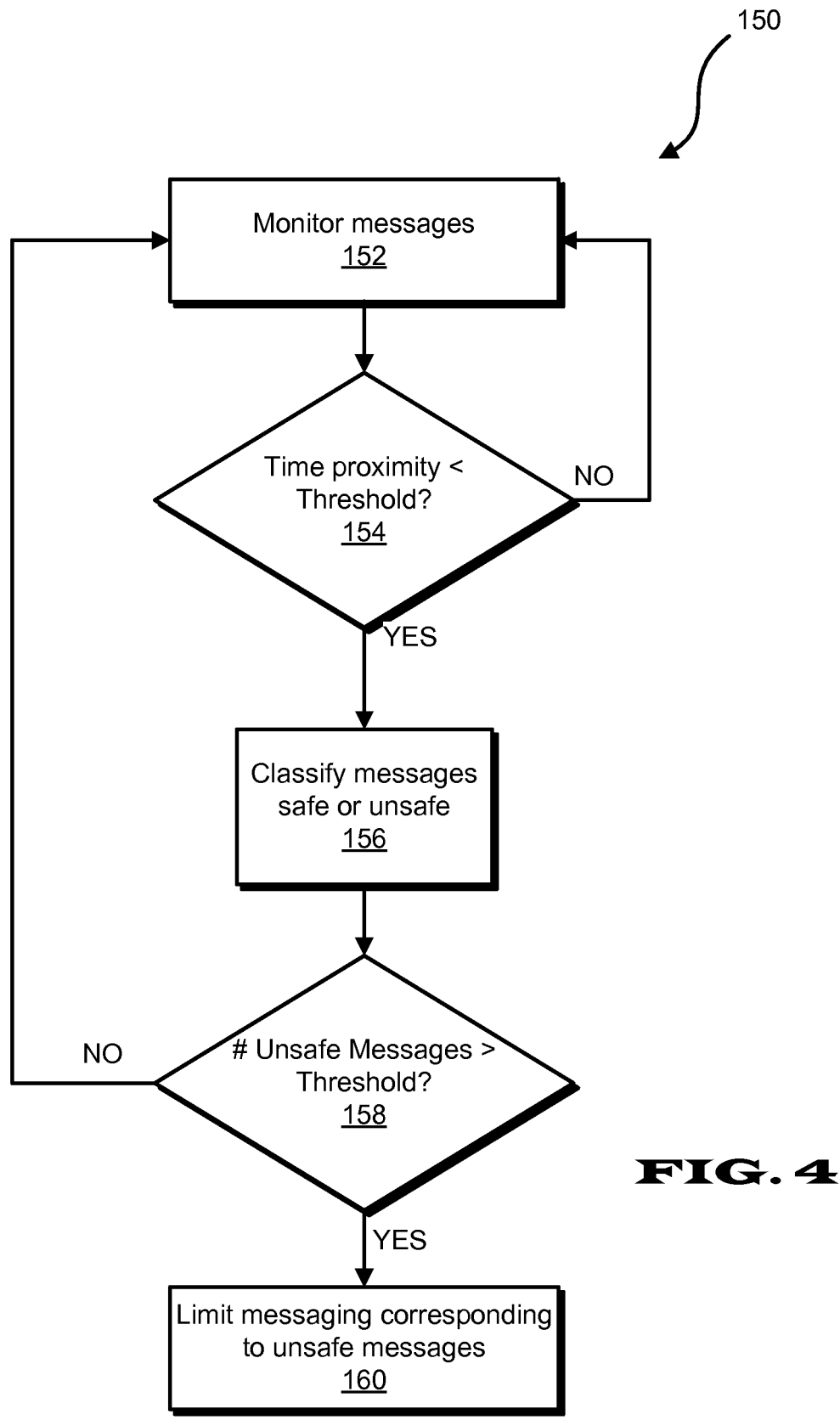

Referring to FIG. 4 a method 150 incorporating message classification functionality based in part on message content is shown. In a step 152 incoming and outgoing messages are monitored. If it is determined that the time proximity of the monitored messages is less than a particular threshold (step 154), in a step 156 the messages are classified as "safe" or "unsafe" based on message content and proximity. If the number of unsafe messages is greater than a particular threshold (step 158), messaging corresponding to unsafe messages is limited (step 160). Limiting messaging can include blocking messages directed to the target device 12 from phone numbers from which unsafe messages originated. Alternatively, limiting messaging can include blocking messages from the target device 12 to phone numbers to which unsafe messages were transmitted by the target device 12. Alternatively, limiting messaging can include blocking incoming and outgoing messages classified as unsafe based on content. The threshold 158 can be dependent upon a classification of the messages, wherein for example messages with a more hostile, aggressive, or negative intent correspond to a lower threshold number of messages to trigger messaging limits than messages with a more benevolent intent.

In limiting messages from particular phone numbers, the control manager 40 or control agent 13 can enable a filter to block messages to or from a particular phone number. Such filter can be enabled locally on the target device 12 or at the message forwarding center 20 via filter instructions provided through the carrier API 30. If filtering is enabled locally on the target device 12, the control agent 13 can delete or move filtered messages from the message datastore 15 (e.g., an SMS inbox) or reroute or delete messages prior to being saved in the message datastore 15. If filtering is enabled at the message forwarding center 20, filtered messages are intercepted and not forwarded to their intended destination device or system. Notifications to a user of the target device 12 or other entity can include the particular phone number or numbers corresponding to filtered messages.

The control agent 13 or control manager 40 can maintain a list of phone numbers (i.e., "whitelisted numbers") to exclude from blocking. For example, all incoming messages can be blocked except incoming messages from whitelisted numbers or all outgoing messages can be blocked except outgoing messages to whitelisted numbers.

Figure 5:
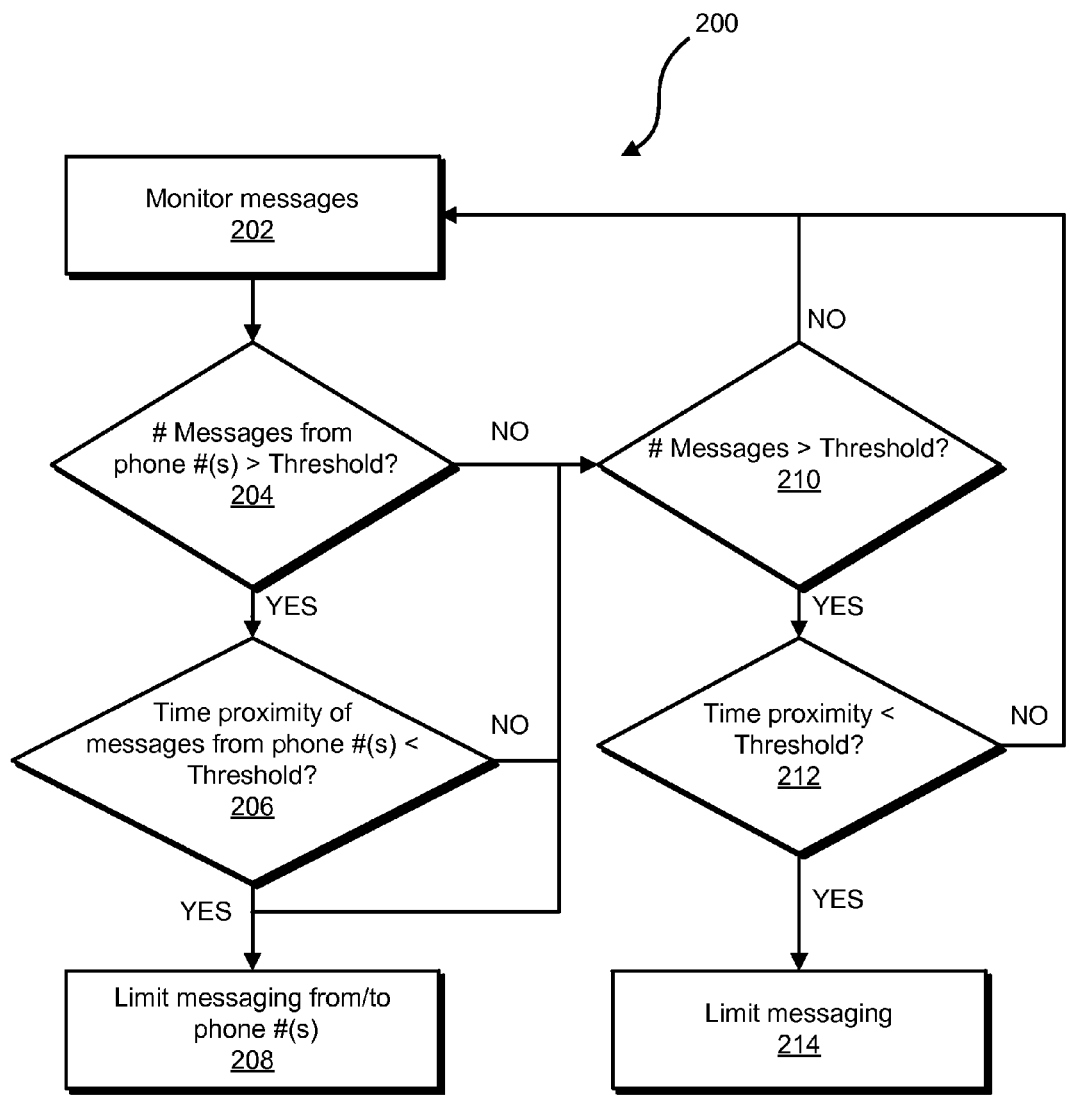

Referring to FIG. 5, a method 200 is shown for controlling delivery of electronic messages. The method 200 and associated processes are described with reference to the components shown in FIGS. 1 and 2, including the target control agent 13 and control manager 40, which can individually or in combination perform the method 200. The method 200 may alternatively be performed via other suitable systems. In a step 202 incoming messages to a target device 12 and outgoing messages from the target device 12 are monitored. If it is determined that the number of messages from a particular phone number or numbers is greater than a particular threshold (step 204), and if it is determined that the time proximity of the messages from the particular phone number(s) is less than a particular threshold (step 206), incoming or outgoing messages are limited from and/or to the particular phone number or numbers (step 208). The control agent 13 can perform the method 200 by monitoring the message datastore 15 of the target device 12. Total messages are also monitored. If it is determined that the total number of messages from/to all phone numbers, or phone numbers not on a particular list (e.g., whitelisted "safe" numbers), or phone numbers meeting particular criteria is greater than a particular threshold (step 210), and if it is determined that the time proximity of the total messages is less than a particular threshold (step 212), then the corresponding incoming or outgoing messaging is limited (step 214). The thresholds 204, 206, 210, 212 can be dependent upon a classification of the messages, wherein for example messages with a hostile, aggressive, or negative intent correspond to a lower threshold number of messages in steps 204 and 210 to trigger messaging limits than messages with a determined benevolent intent.

The control agent 13 or control manager 40 can require an authorization prior to limiting message transmission or message receipt. This authorization can originate from an authorized entity such as a parent of the user of the target device 12. Alternatively the authorization can originate from the user of the target device 12. Referring to FIG. 6, a method 300 includes the steps shown in the method 200 plus the steps 302, 304, 306, 308. In step 302, a notification is provided to an authorized entity, for example a user of the computing device 16 or the target device 12, responsive to determining that the number of messages from a particular phone number or numbers is greater than a particular threshold (step 204), and determining that the time proximity of the messages from the particular phone number(s) is less than a particular threshold (step 206). The notification can be provided to the user of the target device 12 via the control agent 13. Alternatively, the notification can be provided to the computing device 16 from the control agent 13 or from the control manager 40 as a network communication to the management application 19, as a text message, as an email, or as a voicemail. The notification facilitates a user response by enabling a user interface or link for a user to provide an instruction to limit messaging from or to the target device 12. In a step 304, an instruction from the user of the target device 12, a user of the computing device 16, or other entity triggers limiting of messaging to or from a particular phone number or phone numbers (step 208).

In step 306, a notification is provided to an authorized entity responsive to determining that the total number of messages from/to all phone numbers or phone numbers not on a particular list (e.g., whitelisted "safe" numbers), or phone numbers meeting particular criteria is greater than a particular threshold (step 210), and responsive to determining that the time proximity of the messages is less than a particular threshold (step 212). In a step 308, an instruction from the user of the target device 12, a user of the computing device 16, or other entity triggers limiting of messaging to or from the target device 12 (step 214).

Exemplary notifications corresponding to step 302 of the method 300 are provided on a display 25 of a target device 12 as shown in FIGS. 8A and 8B. In FIG. 8A, an exemplary notification 80 states "You have received a high volume of text messages from 415-555-7654. Do you want to block messages from this number?" In FIG. 8B, an exemplary notification 82 states "You have sent a high volume of text messages to 415-555-7654. Do you want to block outgoing messages to this number?" The notifications 80, 82 can be generated by the control agent 13 on the target device 12 and can be accompanied by a block button 84 allowing a user to instruct the control agent 13 to block incoming or outgoing messaging via communication to the carrier API 30 (see FIG. 1), via communication to the control manager 40 (see FIG. 2), or via local messaging restriction on the target device 12.

Alternatively, or in addition to the exemplary notifications 80, 82 provided to the user of the target device 12, a notification can be provided to another entity via a computing device 16 on a display 27 responsive to the number of messages from one or more particular phone #(s) exceeding a particular threshold within a particular period of time. Such other entity can correspond for example to a parent of the user of the target device 12. In FIG. 8C, an exemplary notification 86 states "Your son Jimmy has received a high volume of text messages from 415-555-7654. Do you want to block Jimmy's incoming messages from this number?" In FIG. 8D, an exemplary notification 88 states "Your son Jimmy has sent a high volume of text messages to 415-555-7654. Do you want to block Jimmy's outgoing messages to this number?" The exemplary notifications 86, 88 can be generated by the management application 19 based on data received from the control agent 13 or the control manager 40. A block button 90 is provided on the display 27 to allow a user of the device 16 to instruct the management application 19 to block incoming or outgoing messaging via communication to the carrier API 30 (see FIG. 1), via communication to the control manager 40 (see FIG. 2), or via communication to the control agent 13 on the target device 12. Alternatively, indications 86, 88 can comprise text messages (e.g., SMS) received by the computing device 16 from the control agent 13 via the target device 12 or received from the control manager 40.

Notifications corresponding to step 306 of the method 300 can read for example "You have received a high volume of messages. Do you want to block incoming messages?" or "Your son Jimmy has received a high volume of messages. Do you want to block Jimmy's incoming messages?" or "Your son Jimmy has sent a high volume of messages. Do you want to block Jimmy's outgoing messages?"

Limiting message transmission or message receipt can be dependent on a telecommunications carrier pricing plan for the target device 12. Telecommunications carriers often have at least 2 billing options for pricing SMS messages: a flat monthly rate, or a per message charge. For a target device 12 operating under a per message charge plan with no preset limits on the number of text messages that can be sent or received, an excessive number of text messages received, for example during a messaging attack, can result in an expensive bill. A messaging attack can comprise thousands of incoming text messages to an attacked target device 12.

The control agent 13 and/or the control manager 40 are configured to determine the carrier pricing plan of the target device 12 through communication with the telecommunications carrier (e.g. via the carrier API 30), or through a query of configuration settings of the target device 12. Limits for message transmission and receipt can be set based on the pricing plan. For example, if flat rate billing is in effect for the target device 12, no messaging limits are set or a relatively higher volume of received or sent text messages are required to trigger messaging limits. If per message billing is applicable, a relatively lower volume of received or sent text messages can trigger messaging limits.

If the carrier price plan corresponds to a per message charge, the control agent 13 and/or the control manager 40 can communicate with the carrier API 30 or other user (e.g., a parent of the target device user) to determine if the carrier plan of the target device 12 is subject to a maximum number of text messages received or sent over a fixed time period, for example 200 messages per month. FIG. 9A shows an exemplary communication to a parent of the target device user on the display 27 of the computing device 16. The communication includes an indication 180 which states "Your son Jimmy has received a high volume of text messages. You pay separately for text messages. Are messaging limits set for Jimmy's account?" Input buttons 182 corresponding to "Yes", "No", and "Don't know" are provided to enable the user of the computing device 16 to answer the query, which answer is forwarded by the management application 19 to the control agent 13 or the control manager 40.

If messaging limits have not been configured by the carrier, the control agent 13 or the control manager 40 can communicate with the carrier API 30 to enable such a limit. A request for input from an authorized entity such as a parent of a user of the target device 12 can be made by the control agent 13 as to their choice of limit. Input from the authorized entity is communicated to the telecommunications carrier via the carrier API 30 to set messaging limits. FIG. 9B shows an exemplary communication to a parent of the target device user on the display 27 of the computing device 16. The communication includes an indication 184 which states "Your son Jimmy has received a high volume of text messages. You pay separately for text messages. Do you want to set messaging limits for Jimmy's account?" Input buttons 186 are provided corresponding to "Yes" and "No" to enable a user of the computing device 16 to answer the query. FIG. 9C shows another exemplary communication on the display 27 of the computing device 16. The communication includes an indication 188 which states "Your son Jimmy has received a high volume of text messages. Please indicate desired message limit for Jimmy." Input area 190 is provided enabling a user to enter a limit for a maximum number of messages in a particular time period, and input buttons 192 enable user input of an associated time period.

Alternatively, if the control agent 13 or control manager 40 are unable to communicate with the carrier API 30 to set messaging limits, a notification can be provided to the authorized entity instructing the authorized entity to contact the telecommunications carrier to set such a limit for the target device 12. FIG. 9D shows an exemplary communication to a parent of the target device user on the display 27 of the computing device 16. The communication includes an indication 194 which states "Your son Jimmy has received a high volume of text messages. Consider contacting your telecommunications carrier at the link below to set limits on received messages." Link button 196 is provided to direct the user of the device 16 to a network location for setting messaging limits for the target device 12.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A messaging control method comprising:
   detecting at least one of incoming messages to a mobile device and outgoing messages from the mobile device;
   determining by at least one processor a number of and a time proximity of the at least one of the incoming messages and the outgoing messages;
   limiting at least one of message transmission and message receipt by the mobile device based at least on the number and time proximity of the at least one of the incoming messages and the outgoing messages; and
   providing a notification to at least one user based at least on the number and time proximity of the at least one of the incoming messages and the outgoing messages.

2. The method of claim 1, further comprising:
   transmitting the notification via a network to a particular party based at least on the number and time proximity of the at least one of the incoming messages and the outgoing messages.

3. The method of claim 2, further comprising:
   receiving a response to the notification from the particular party; and
   limiting the at least one of the message transmission and the message receipt based on the response from the particular party.

4. The method of claim 1, wherein limiting the at least one of the message transmission and the message receipt comprises communication with a telecommunications carrier server system.

5. The method of claim 1, wherein providing the notification comprises providing the notification to a user of the mobile device.

6. The method of claim 1, wherein providing the notification comprises transmitting the notification to a party via a network.

7. The method of claim 6, wherein providing the notification comprises providing at least one phone number corresponding to the at least one of the incoming messages and the outgoing messages.

8. The method of claim 6, wherein providing the notification comprises transmitting the notification via at least one of electronic message and voice message.

9. The method of claim 1, wherein limiting the at least one of the message transmission and the message receipt comprises at least one of preventing receipt of messages from a particular phone number and preventing transmission of messages to a particular phone number, wherein the phone number corresponds to the at least one of the incoming messages and the outgoing messages.

10. The method of claim 1, wherein limiting the at least one of the message transmission and the message receipt comprises at least one of preventing receipt of messages from phone numbers not on a particular list and preventing transmission of messages to phone numbers not on a particular list.

11. The method of claim 1, further comprising limiting the at least one of the message transmission and the message receipt to a particular rate.

12. The method of claim 1, wherein the at least one of the incoming messages and the outgoing messages comprise incoming messages, the method further comprising filtering the incoming messages based at least on the number and time proximity of the at least one of the incoming messages and the outgoing messages.

13. The method of claim 12, wherein filtering the incoming messages comprises at least one of deleting and moving the incoming messages from a storage repository on the mobile device.

14. The method of claim 1, wherein the at least one of the incoming messages and the outgoing messages comprise incoming messages, the method further comprising filtering the incoming messages based at least on the number and time proximity of the at least one of the incoming messages and the outgoing messages and based on at least one phone number corresponding to the incoming messages.

15. The method of claim 1, wherein the determining the number of and a time proximity of the at least one of the incoming messages and the outgoing messages comprises determining a number of messages exceeds a particular threshold within a particular time period.

16. The method of claim 1, wherein limiting the at least one of message transmission and message receipt comprises blocking messaging for a particular period of time.

17. A messaging control method comprising:
   detecting at least one of a plurality of incoming messages to a mobile device and a plurality of outgoing messages from the mobile device;
   determining by at least one processor a number of and a time proximity of the at least one of the incoming messages and the outgoing messages; and
   limiting at least one of message transmission and message receipt by the mobile device based at least on the number and time proximity of the at least one of the incoming messages and the outgoing messages;
   at least one of comparing content of the plurality of incoming messages and comparing content of the plurality of outgoing messages to determine a particular similarity; and limiting the at least one of message transmission and message receipt based at least on the number and time proximity and the determination of the particular similarity.

18. The method of claim 17, further comprising:
comparing the at least one of the incoming messages and the outgoing messages to determine similar messages;
storing phone numbers corresponding to the similar messages; and
blocking messages corresponding to the phone numbers corresponding to the similar messages.

19. A messaging control method comprising:
detecting at least one of incoming messages to a mobile device and outgoing messages from the mobile device;
determining by at least one processor a number of and a time proximity of the at least one of the incoming messages and the outgoing messages; and
limiting at least one of message transmission and message receipt by the mobile device based at least on the number and time proximity of the at least one of the incoming messages and the outgoing messages;
determining a sentiment of the at least one of the incoming messages and the outgoing messages; and
limiting the at least one of message transmission and message receipt based at least on the number and time proximity and the determination of the particular sentiment.

20. The method of claim 19, wherein determining the sentiment comprises applying a classifier to the at least one of the incoming messages and the outgoing messages.

21. The method of claim 19, wherein the determining the number of and a time proximity of the at least one of the incoming messages and the outgoing messages comprises determining a number of messages exceeds a particular threshold within a particular time period, the method further comprising:
determining a sentiment of the at least one of the incoming messages and the outgoing messages; and
determining the particular threshold based on the determined sentiment.

22. A messaging control method comprising:
detecting at least one of incoming messages to a mobile device and outgoing messages from the mobile device;
determining by at least one processor a number of and a time proximity of the at least one of the incoming messages and the outgoing messages; and
limiting at least one of message transmission and message receipt by the mobile device based at least on the number and time proximity of the at least one of the incoming messages and the outgoing messages;
determining a telecommunication carrier pricing plan corresponding to an account for the mobile device; and
limiting the at least one of message transmission and message receipt by the mobile device based at least on the number and time proximity and the pricing plan.

23. The method of claim 22, further comprising transmitting a notification via a network to a particular party based at least on the pricing plan and the number and time proximity of the at least one of the incoming messages and the outgoing messages.

24. A computing system comprising at least one non-transitory computer readable storage medium having encoded thereon instructions that, when executed by one or more processors of the system, cause the system to perform a process including:
detecting at least one of incoming messages to a mobile device and outgoing messages from the mobile device;
determining by at least one processor a number and time proximity of the at least one of the incoming messages and the outgoing messages;
limiting at least one of message transmission and message receipt by the mobile device based at least on the number of and time proximity of the at least one of the incoming messages and the outgoing messages; and
providing a notification to at least one user based at least on the number and time proximity of the at least one of the incoming messages and the outgoing messages.

25. The computing system of claim 24, wherein the computing system comprises a mobile device, and wherein limiting the at least one of the message transmission and the message receipt comprises transmitting instructions by the mobile device to a network connectable system, the instructions operable to enable limiting electronic message forwarding to the mobile device through a network.

26. A communications network comprising a first device corresponding to a first user, the first device configured for:
detecting at least one of incoming messages to the first device and outgoing messages from the first device;
determining by at least one processor a number of and a time proximity of the at least one of the incoming messages and the outgoing messages; and
transmitting a notification based at least on the number of and time proximity of the at least one of the incoming messages to the first device and the outgoing messages to the first device; and
a second device corresponding to a second user configured for:
receiving a notification based at least on the number of and time proximity of the at least one of the incoming messages to the first device and the outgoing messages to the first device;
receiving instructions from the second user to limit at least one of message transmission and message receipt by the first device; and
transmitting the instructions to a computing system operable to enable limiting at least one of message transmission and message receipt by the first device.

27. The communications network of claim 26, wherein transmitting the instructions comprises transmitting instructions from the second device to the first device, wherein the first device is configured to limit at least one of message transmission and message receipt by the first device.

28. The communications network of claim 27, wherein the first device is configured to limit at least one of message transmission and message receipt by the first device based on signals provided to at least one of a carrier computing system via an application program interface (API) and a system configured for interface with the carrier computing system via the API.

29. The communications network of claim 26, wherein transmitting the instructions comprises transmitting instructions from the second device to at least one of a carrier computing system via an application program interface (API) and a system configured for interface with the carrier computing system via the API.

* * * * *